(12) United States Patent
Glück

(10) Patent No.: US 6,384,094 B1
(45) Date of Patent: May 7, 2002

(54) METHOD FOR PRODUCING EXPANDABLE STYRENE POLYMERS CONTAINING EXFOLIATED GRAPHITE PARTICLES

(75) Inventor: Guiscard Glück, Mainz (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/744,665

(22) PCT Filed: Jul. 12, 1999

(86) PCT No.: PCT/EP99/04867

§ 371 Date: Jan. 29, 2001

§ 102(e) Date: Jan. 29, 2001

(87) PCT Pub. No.: WO00/06635

PCT Pub. Date: Feb. 10, 2000

(30) Foreign Application Priority Data

Jul. 27, 1998 (DE) .......................................... 198 33 664

(51) Int. Cl.$^7$ ................................ C08J 9/20; C08J 9/22

(52) U.S. Cl. .............................. 521/56; 521/59; 521/60; 521/82; 264/DIG. 9

(58) Field of Search ............................... 521/56, 59, 60, 521/82; 264/DIG. 9

(56) References Cited

U.S. PATENT DOCUMENTS 5,783,612 A * 7/1998 Batscheider et al. .......... 521/56
5,880,166 A * 3/1999 Glück et al. ................... 521/59

FOREIGN PATENT DOCUMENTS

DE 29616362 11/1996
EP 0245779 11/1987

* cited by examiner

Primary Examiner—Morton Foelak

(57) ABSTRACT

The invention relates to a process for the preparation of expandable able styrene polymers containing particles of graphite by polymerization merization of styrene in aqueous suspension in the presence of particles of graphite having a mass density of less than 1.8 g/cm$^3$.

9 Claims, No Drawings

METHOD FOR PRODUCING EXPANDABLE STYRENE POLYMERS CONTAINING EXFOLIATED GRAPHITE PARTICLES

The invention relates to a process for the preparation of expandable styrene polymers containing particles of graphite.

Polystyrene bead foams have been known for many years and have proven their usefulness in many applications. Such foamed plastics are prepared by foaming particles of polystyrene impregnated with expanding agents followed by welding of the expanded particles thus prepared to produce shaped articles. An important area of application is thermal insulation in the building industry.

It is known to be possible to reduce the thermal conductivity of foamed plastics by including athermanous materials such as carbon black, metal oxides, metal powders or pigment dyes. Patent application PCT/EP 97/02457 proposes that the thermal conductivity of polystyrene foams be reduced by carrying out the preparation of expandable particles of polystyrene by polymerization of styrene in aqueous suspension in the presence of from 0.05 to 25 wt % of particles of graphite. Commercial graphite possesses a mass density ranging from 2.1 to 2.3 g/cm$^3$. According to PCT/EP 97/02457, the polymerization is preferably carried out using a solution of polystyrene in styrene. This mode of operation however requires an additional processing step, namely the dissolution of polystyrene in styrene.

It is thus an object of the present invention to avoid this processing step and to provide a simple process for the preparation of expandable styrene polymers containing particles of graphite.

This object is achieved by the use of particles of graphite having a mass density of less than 1.8 g/cm$^3$.

Accordingly, the invention relates to a process for the preparation of expandable styrene polymers (EPS) containing particles of graphite by polymerization of styrene, optionally together with a content of comonomers equal to 20% of its weight, in aqueous suspension in the presence of particles of graphite with the addition of an expanding agent before, during or after polymerization, the particles of graphite having a mass density of less than 1.8 g/cm$^3$.

The invention also relates to particulate expandable styrene polymers containing from 0.05 to 25 wt % of particles of graphite having a mass density of less than 1.8 g/cm$^3$.

Unexpanded expandable graphite having a mass density greater than 1.5 g/cm$^3$ is known to be useful as a flameproofing agent for foamed plastics, particularly cellular polyurethanes.

By reason of its layer-lattice structure, graphite is capable of creating special forms of interstitial compounds. In these so-called lattice intermediates, foreign atoms or molecules have been taken up into the carbon-carbon interstices partly in stoichiometric ratios. These graphitic compounds containing, for example, sulfuric acid as foreign molecule, which are also produced on an industrial scale, are referred to as expandable graphite. The mass density of this expandable graphite ranges from 1.5 to 2.1 g/cm$^3$ and the particle size is from 100 to 1000 μm. By heating to temperatures above approximately 150° C., in particular to from 500 to 1000° C., expandable graphite can be expanded, during which process its mass density may be lowered to values below 0.01 g/cm$^3$. This expanded expandable graphite can be ground to any degree of fineness. Within the scope of the invention, particles of graphite having a mass density of less than 1.5 g/cm$^3$ and particularly from 0.1 to 1.2 g/cm$^3$ are preferred, the average diameter of the particles of graphite being preferably from 1 to 200 μm and more preferably from 2 to 50 μm.

By expandable styrene polymers we mean styrene polymers containing expanding agents.

The expandable styrene polymers of the invention particularly contain, as polymeric matrix, homopolystyrene or styrene copolymers having a content of up to 20 wt %, based on the weight of the polymers, of ethylenically unsaturated comonomers, particularly alkyl styrenes, divinylbenzene, acrylonitrile or α-methylstyrene.

During the suspension polymerization of the invention, conventional auxiliaries such as peroxide initiators, suspension stabilizers, expanding agents, chain-transfer agents, expanding agents, nucleating agents and softeners can be added. We particularly prefer to add flameproofing agents, preferably in amounts of from 0.6 to 6 wt % and synergistic flame retardants in amounts of from 0.1 to 1 wt %, based, in each case, on the resulting styrene polymer. Preferred flame retardants are aliphatic, cycloaliphatic and aromatic bromine compounds such as hexabromocyclododecane, pentabromomonochlorocyclohexane and pentabromophenylallyl ether. Suitable synergists are organics having unstable C—C or O—O bonds such as dicumyl and dicumyl peroxide. Expanding agents are added in amounts of from 3 to 10 wt % based on styrene polymer. They can be added before, during or after polymerization of the suspension. Suitable expanding agents are aliphatic hydrocarbons containing from 4 to 6 carbon atoms. It is advantageous to use, as suspension stabilizers, inorganic Pickering dispersing agents, eg magnesium diphosphate or calcium phosphate.

We have found that the stability of the suspension does not require that a solution of polystyrene be used at the commencement of suspension polymerization.

The suspension polymerization is preferably carried out at two temperature levels, a peroxide which decomposes at low temperatures, eg dibenzoyl peroxide but preferably t-butylperoxy-2-ethylhexanoate being first used at 80° to 100° C., followed by heating to 110° to 140° C. accompanied by polymerization with a peroxide which decomposes at elevated temperatures, eg dicumyl peroxide.

During the suspension polymerization of the invention, the particles of graphite are added preferably in amounts of from 0.05 to 25, more preferably from 0.5 to 8 wt % and most preferably from 1 to 4 wt %, based on the resulting styrene polymer. Basically, it is also possible to add the particles of graphite at some point following commencement of the suspension polymerization, preferably during the first half of the polymerization cycle. During suspension polymerization, there are formed bead-shaped, substantially round particles having an average diameter ranging from 0.2 to 2 mm in which the particles of graphite are uniformly distributed. They can be coated with conventional coating compositions, eg metal stearates, glycerol esters and finely divided silicates.

The expandable styrene polymers containing particles of graphite can be processed so as to provide polystyrene foams having densities of from 5 to 35 g/cm$^3$, preferably from 8 to 25 g/cm$^3$ and more preferably from 10 to 15 g/cm$^3$.

To this end, the expandable particles are pre-expanded. This usually takes place by heating the particles with steam in so-called pre-expanders.

The pre-expanded particles thus obtained are then welded together 45 so as to form shaped articles. To this end, the pre-expanded particles are filled into molds that are not hermetically sealed and are subjected to the action of steam. Following cooling, the molded articles can be withdrawn.

The foamed plastics prepared from the expandable styrene polymers of the invention are distinguished by excellent thermal insulation properties. Thus by adding 2 wt % of graphite to an expandable styrene polymer, where the mass density of the foam is 10 g/cm$^3$, the thermal conductivity can be reduced from 44 mW/m·K to below 35 mW/m·K.

Due to the possibility of reducing the mass density of the styrene polymers to a perceptible degree for a given thermal conductivity, it is possible to economize on material. Since the same degree of thermal insulation can be achieved as with conventional expandable styrene polymers but using substantially lower bulk densities, thinner foam panels can be used when working with the expandable particles of polystyrene manufactured by the process of the invention, which makes for economy of space and, in particular, economy of material.

It is also possible to prepare EPS foams having antistatic properties combined with electrical conductivity by the addition of expanded expandable graphite in, on account of their greatly increased volume, relatively small amounts, eg from 5 to 15 wt %.

The invention is illustrated below with reference to the following examples.

EXAMPLES

Example 1
Thermal Conductivity

In 20.4 kg of styrene there are uniformly suspended 200 g of pulverulent expanded expandable graphite having a density of 1.0 g/cm$^3$, ie 1 wt % of graphite, based on the weight of styrene, and having an average particle size of 10 μm, in admixture with 85.0 g of dicumyl peroxide and 13.6 g of t-butylperoxy-2-ethylhexanoate. The organic phase is introduced into 19.5 L of de-ionized water in a stirred tank having a capacity of 50 L. The aqueous phase contains 46.6 g of sodium diphosphate and 86.3 g of magnesium sulphate (bitter salt). The suspension is heated to 80° C. Following a period of 140 minutes, 2.34 g of emulsifier K 30/40 (Bayer AG) are added. After a further 30 minutes, 1277.1 g of pentane are subsequently metered in and are polymerized to completion at 134° C.

There are obtained bead-shaped granules which are expanded so as to form foam panels having a density of 15 g/cm$^3$ and attain a thermal conductivity of 32 g/cm$^3$.

Example 2
Antistatic Properties

In 20.4 kg of styrene there are uniformly suspended 1000 g of pulverulent expanded expandable graphite having a density of 0.05 g/cm$^3$, ie 1.0 wt % of graphite, based on the weight of styrene, and having an average particle size of 20 μm, in admixture with 85.0 g of dicumyl peroxide and 13.6 g of t-butylperoxy-2-ethylhexanoate. The organic phase is introduced into 19.5 L of de-ionized water in a stirred tank having a capacity of 50 L. The aqueous phase contains 46.6 g of sodium diphosphate and 86.3 g of magnesium sulphate (bitter salt). The suspension is heated to 80° C. Following a period of 140 minutes, 2.34 g of emulsifier K 30/40 (Bayer AG) are added. After a further 30 minutes, 1277.1 g of pentane are metered in and are polymerized to completion at 134° C.

There are obtained bead-shaped granules having a specific volume resistance of $1.8 \cdot 10^5$ Ω. (for comparison, with no addition of graphite $>10^{14}$ Ω).

We claim:

1. A process for the preparation of expandable styrene polymers or copolymers containing particles of expanded expandable graphite having a mass density of from 0.1 to 1.2 g/cm$^3$ comprising polymerizing styrene, optionally with comonomers up to 20 wt % based on the weight of styrene in aqueous suspension in the presence of particles of said graphite with the addition of an expanding agent before, during or after polymerization.

2. The process according to claim 1, wherein said polymerizing is carried out in the presence of from 0.05 to 25 wt %, of said graphite, based on said styrene polymers or copolymers.

3. The process according to claim 1, wherein expanded expandable graphite using an average particle diameter of from 1 to 200 μm is used.

4. Particulate expandable styrene polymers or copolymers containing from 0.05 to 25 wt % of particles of expanded expandable graphite, wherein said graphite has a mass density of from 0.1 to 1.2 g/cm$^3$.

5. A method of using the particulate expandable styrene polymers or copolymers as defined in claim 4 for the preparation of foamed plastic having a mass density of from 5 to 35 g/cm$^3$.

6. The process according to claim 1, wherein said polymerizing is carried out in the presence of from 0.5 to 8 wt %, or said graphite, based on said styrene polymers or copolymers.

7. The process according to claim 1, wherein said polymerizing is carried out in the presence of 1 to 4 wt % of said graphite, based on said styrene polymers or copolymers.

8. The process according to claim 5, wherein said foamed plastic has a mass density of from 8 to 25 g/cm$^3$.

9. The process according to claim 5, wherein said foamed plastic has a mass density of from 10 to 15 g/cm$^3$.

* * * * *